US008328272B2

(12) United States Patent
Fujimura

(10) Patent No.: US 8,328,272 B2
(45) Date of Patent: Dec. 11, 2012

(54) LOWER STRUCTURE OF VEHICLE BODY REAR PORTION

(75) Inventor: Takanobu Fujimura, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 80 days.

(21) Appl. No.: 13/005,896

(22) Filed: Jan. 13, 2011

(65) Prior Publication Data

US 2011/0175401 A1 Jul. 21, 2011

(30) Foreign Application Priority Data

Jan. 18, 2010 (JP) ................................ 2010-008085

(51) Int. Cl.
*B60J 7/00* (2006.01)

(52) U.S. Cl. .......... 296/187.11; 296/203.04; 296/193.07

(58) Field of Classification Search ............. 296/187.11, 296/187.09, 193.08, 37.2
See application file for complete search history.

(56) References Cited

U.S. PATENT DOCUMENTS 4,152,012 A * 5/1979 Reidelbach et al. .......... 280/784
7,540,559 B2 * 6/2009 Egawa et al. ............ 296/203.04

FOREIGN PATENT DOCUMENTS

JP 2006-088785 4/2006
JP 2006-123708 5/2006
JP 2006-205810 8/2006
JP 2007-131259 5/2007

* cited by examiner

*Primary Examiner* — Joseph Pape
(74) *Attorney, Agent, or Firm* — Alston & Bird LLP

(57) ABSTRACT

A lower structure of a vehicle body rear portion includes: a rear floor panel in a rear portion of a vehicle; a spare tire housing formed on the floor panel in such a manner as to be recessed downward; rear side members extending in a front and rear direction on respective right and left ends of the floor panel; a rear cross member arranged in front of the housing and connecting the paired right and left side members; and a spare tire cross member attached to the housing and connecting the paired side members, wherein a rear part of each of the side members is formed to have a rigidity lower than a rigidity of a front part thereof, the rear part extending on the rear side from a joint part joining with the spare tire cross member, the front part extending on the front side from the joint part.

3 Claims, 4 Drawing Sheets

1
4c
7
A
6
4a
A
4
3
4b

F
1
4c
4a
6
3
2
4
4b

LOWER STRUCTURE OF VEHICLE BODY REAR PORTION

FIELD OF THE INVENTION

The present invention relates to a lower structure of a vehicle body rear portion, which is formed so as to be capable of absorbing a load applied from behind the vehicle.

BACKGROUND OF THE INVENTION

In a recent vehicle, when a load is applied from behind the vehicle, a vehicle body rear portion is required to absorb the load. Therefore, a lower structure of the vehicle body rear portion is configured in many cases in such a manner as to be able to absorb a load applied from behind the vehicle by deforming constituent members (such as a rear floor panel, rear side members extending in a front and rear direction of the vehicle on the respective ends of the rear floor panel, and the like) of the lower structure.

For example, Japanese Unexamined Patent Publication No. 2006-205810 and Japanese Unexamined Patent Publication No. 2007-131259 each disclose the following structure. In the structure, rear side members are formed such that a load applied from behind the vehicle can be absorbed in the vehicle body rear portion. Each of the rear side members extends, in front of a spare tire housing, in such a manner as to be inclined upward toward the back of the vehicle. On the vehicle rear side with respect to the inclined portion, each of the rear side members extends horizontally in the front and rear direction of the vehicle. When a load is applied from behind the vehicle, a chevron-like folding (hereinafter, referred to as a "chevron folding") protruding upward, is formed at an inflection point between the inclined portion and the horizontal portion of each rear side member.

Furthermore, Japanese Unexamined Patent Publication No. 2006-88785 and Japanese Unexamined Patent Publication No. 2006-123708 each disclose the following structure. In the structure, in order for a load applied from behind the vehicle to be absorbed on the rear side of the vehicle body rear portion, the rigidity on the rear side in a lower structure of a vehicle body rear portion is lower than the rigidity on the front side. In particular, the lower structure includes paired rear side members, and a rear cross member which connects front end portions of the paired rear side members. In addition, reinforcing members for joining the rear side members to the rear cross member are provided at left and right corners each formed by a corresponding one of the rear side members and the rear cross member.

SUMMARY OF THE INVENTION

However, the structures in Japanese Unexamined Patent Publication No. 2006-205810 and Japanese Unexamined Patent Publication No. 2007-131259 have the following problem. In each structure, when chevron foldings which largely protrude upward, are formed on the rear side members, components arranged below the rear floor panel, such as a fuel tank and a canister, might come closer to each other and come into contact with each other. Furthermore, this causes a problem. Suppose a case in which the inclined portion of each of the rear side members is less inclined such that the degree of upward protruding of the chevron folding of the rear side member can be reduced. This leads to limitations on both the layout of space below the rear floor panel in which many components are required to be arranged, as well as the shape of the framework of a vehicle body. Thereby, the design flexibility is reduced.

Furthermore, as in the structures in Japanese Unexamined Patent Publication No. 2006-88785 and Japanese Unexamined Patent Publication No. 2006-123708, when reinforcing members are provided at the corners each formed by a corresponding one of the rear side members and the rear cross member, the weight of the vehicle is increased by the weight of the reinforcing members. This causes a problem in achieving a vehicle weight reduction. In particular, this influences the fuel consumption performance, and it therefore is a problem.

The present invention has been made in view of such circumstances. An object of the present invention is to provide a lower structure of a vehicle body rear portion, capable of efficiently absorbing a load applied from behind the vehicle while preventing the aforementioned problems of contact between the components arranged below the rear floor panel, reduction of design flexibility, and increase of vehicle weight.

In order to solve the above problems, a lower structure of a vehicle body rear portion of the present invention includes: a rear floor panel which spreads in a horizontal direction in a rear portion of a vehicle; a spare tire housing which is formed on the rear floor panel in such a manner as to be recessed downward; rear side members which extend in a front and rear direction of the vehicle on respective right and left ends of the rear floor panel in a width direction of the vehicle; a rear cross member which is arranged in front of the spare tire housing and connects the paired right and left rear side members; and a spare tire cross member which is attached to the spare tire housing and connects the paired right and left rear side members, wherein a rear part of each of the rear side members is formed to have a rigidity lower than a rigidity of a front part thereof, the rear part extending on the vehicle rear side from a joint part joining with the spare tire cross member, the front part extending on the vehicle front side from the joint part which joins with the spare tire cross member.

Regarding the lower structure of a vehicle body rear portion of the present invention, the rear part of each of the rear side members is formed to have a plate thickness smaller than a plate thickness of the front part of each of the rear side members, and the front part and the rear part of each of the rear side members are connected together by tailored blank welding.

Regarding the lower structure of a vehicle body rear portion of the present invention, a bead is formed on the joint part of each of the rear side members with the spare tire cross member so as to induce folding deformations of the rear side members when a load is applied to the vehicle body from behind the vehicle.

Regarding the lower structure of a vehicle body rear portion of the present invention, the rear part of each of the rear side members extends in such a manner as to be inclined downward toward the back of the vehicle.

Regarding the lower structure of a vehicle body rear portion of the present invention, the spare tire cross member is arranged in such a manner as to extend through the center of the spare tire housing.

According to the present invention, the following effects can be obtained.

The lower structure of a vehicle body rear portion of the present invention includes: the rear floor panel which spreads in the horizontal direction in the rear portion of the vehicle; the spare tire housing which is formed on the rear floor panel in such a manner as to be recessed downward; the rear side members which extend in the front and rear direction of the vehicle on the respective right and left ends of the rear floor panel in the width direction of the vehicle; the rear cross member which is arranged in front of the spare tire housing and connects the paired right and left rear side members; and the spare tire cross member which is attached to the spare tire housing and connects the paired right and left rear side members, wherein the rear part of each of the rear side members is formed to have a rigidity lower than the rigidity of a front part thereof, the rear part extending on the vehicle rear side from the joint part joining with the spare tire cross member, the front part extending on the vehicle front side from the joint part joining with the spare tire cross member.

Accordingly, the rigidity of the vehicle body is higher in the front part of each of the rear side members on the front side of the spare tire cross member, and is lower in the rear part thereof on the rear side of the spare tire cross member. Therefore, when the load is applied to the vehicle body rear portion from behind the vehicle, the chevron foldings of the rear side members can be formed reliably. The chevron folding has a shape in which the joint part joining with the spare tire cross member protrude upward. In the same manner, the chevron folding on the rear floor panel can also be formed reliably. Therefore, the rear part having the lower rigidity is deformed in the front and rear direction of the vehicle, and thereby the load is absorbed. This reduces the degree of upward protruding of the chevron foldings of the rear side members and the rear floor panel. Thereby, components arranged below the rear floor panel can still be spaced away from each other. Therefore, it is possible to efficiently absorb the load to be applied thereto from behind the vehicle while preventing the components from coming close to each other and coming into contact with each other.

Regarding the lower structure of a vehicle body rear portion according to the embodiment of the present invention, the rear part of each of the rear side members is formed to have a plate thickness smaller than the plate thickness of the front part of each of the rear side members, and the front part and the rear part of each of the rear side members are connected together by tailored blank welding. This reliably makes the rigidity of the rear part lower than that of the front part, therefore providing the aforementioned effects. Furthermore, this eliminates the need for adding reinforcing parts for enhancing the rigidity of the front part and therefore eliminates the need for considering space for arranging the reinforcing parts. Accordingly, the layout of the components is not limited, and therefore the design flexibility is not reduced. In addition, there is no increase in vehicle weight by the weight of the reinforcing part. Accordingly, it is possible to more efficiently absorb the load applied from behind the vehicle while preventing the contact between the components arranged below the rear floor panel, reduction of the design flexibility, and increase of the vehicle weight.

Regarding the lower structure of a vehicle body rear portion according to the embodiment of the present invention, the bead is formed on the joint part of each of the rear side members with the spare tire cross member so as to induce folding deformations of the rear side members when the load is applied to the vehicle body from behind the vehicle. This can more reliably form the chevron foldings of the rear side members with the joint parts protruding upward. In the same manner, the chevron folding of the rear floor panel can be formed more reliably. Therefore, the aforementioned effects can be obtained more efficiently.

Regarding the lower structure of a vehicle body rear portion according to the embodiment of the present invention, the rear part of each of the rear side members extends in such a manner as to be inclined downward toward the back of the vehicle. This helps the moving of the rear parts of the rear side members to the lower side of the vehicle, and further reduces the upward protruding of the chevron foldings of the rear side members and the rear floor panel. Accordingly, the aforementioned effects can be obtained more efficiently.

Regarding the lower structure of the vehicle body rear portion according to the embodiment of the present invention, the spare tire cross member is arranged in such a manner as to extend through the center of the spare tire house. Accordingly, the center of the spare tire housing formed on the rear floor panel in such a manner as to be recessed downward corresponds to the protruding portions of the chevron foldings of the rear side members. This further reduces the upward protruding of the chevron foldings of the rear side members and the rear floor panel. Accordingly, the aforementioned effects can be obtained more efficiently.

DETAILED DESCRIPTION OF THE DRAWINGS

Figure 1:
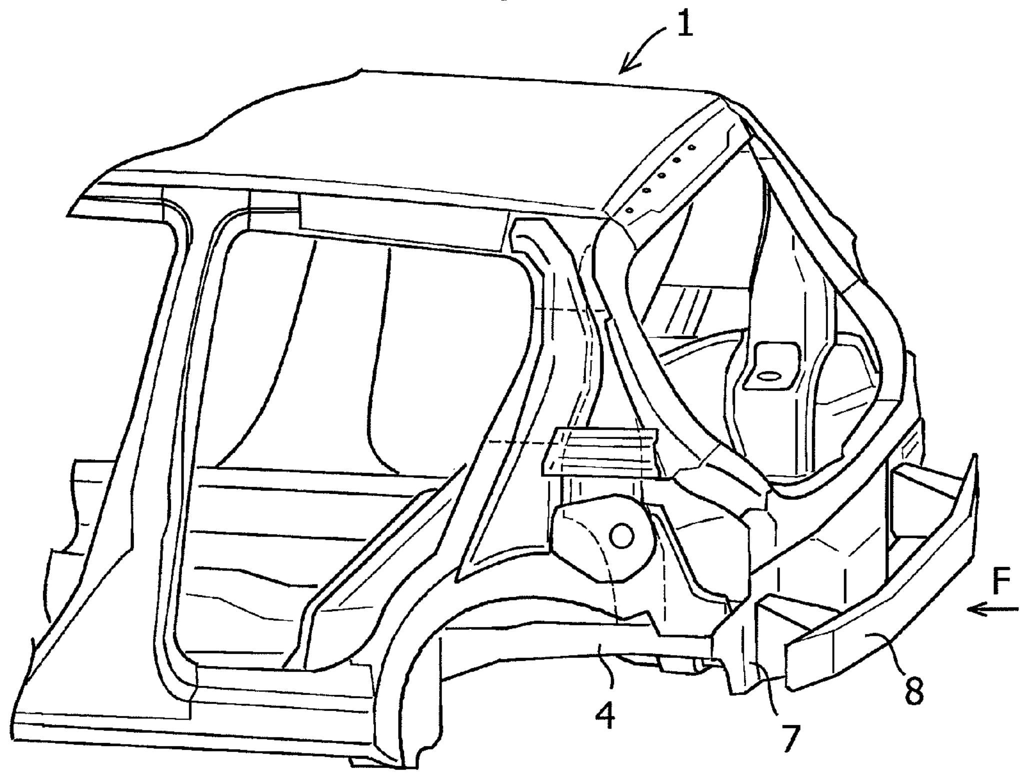
FIG. 1 is a perspective view showing a vehicle body rear portion of a vehicle to which a lower structure according to an embodiment of the present invention is applied.
Figure 2:
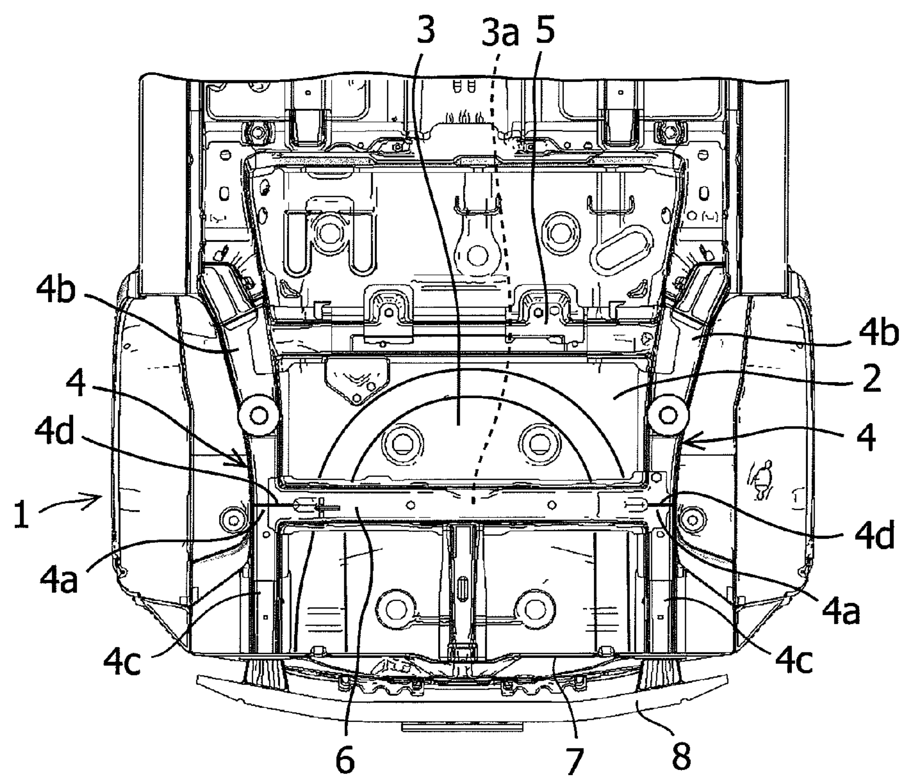
FIG. 2 is a bottom view showing the vehicle body rear portion of the vehicle to which the lower structure according to the embodiment of the present invention is applied.
Figure 3:
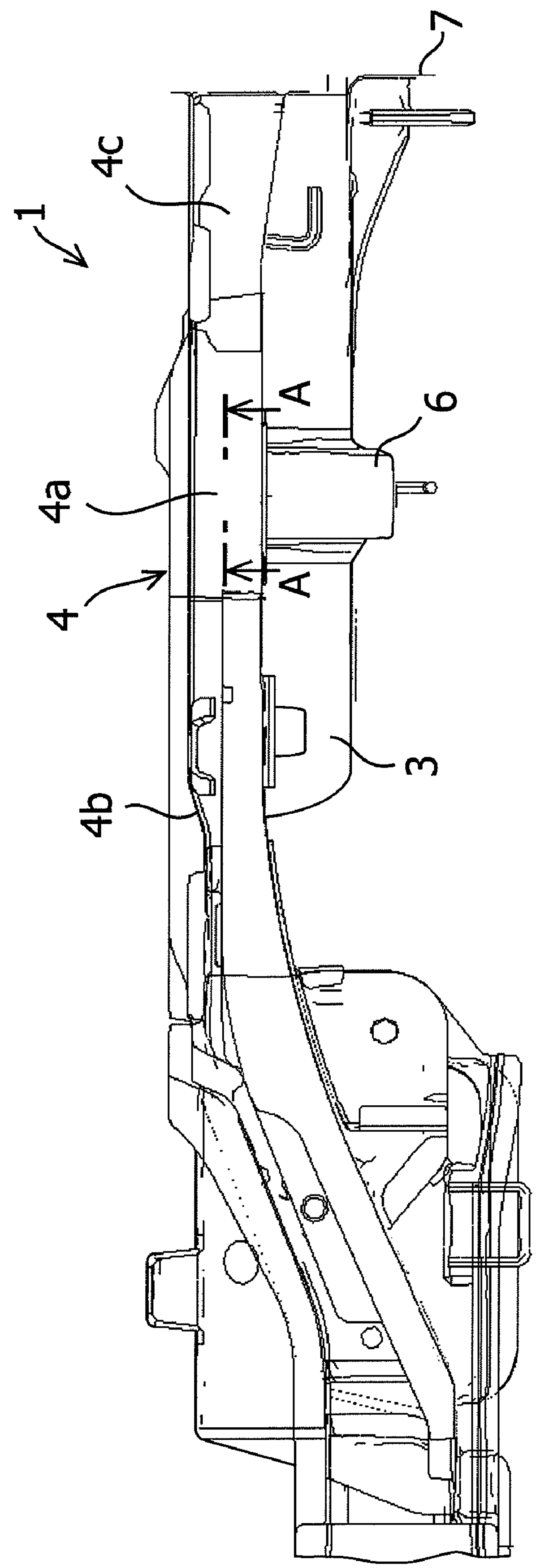
FIG. 3 is a side view showing the vehicle body rear portion of the vehicle to which the lower structure according to the embodiment of the present invention is applied.
Figure 4:
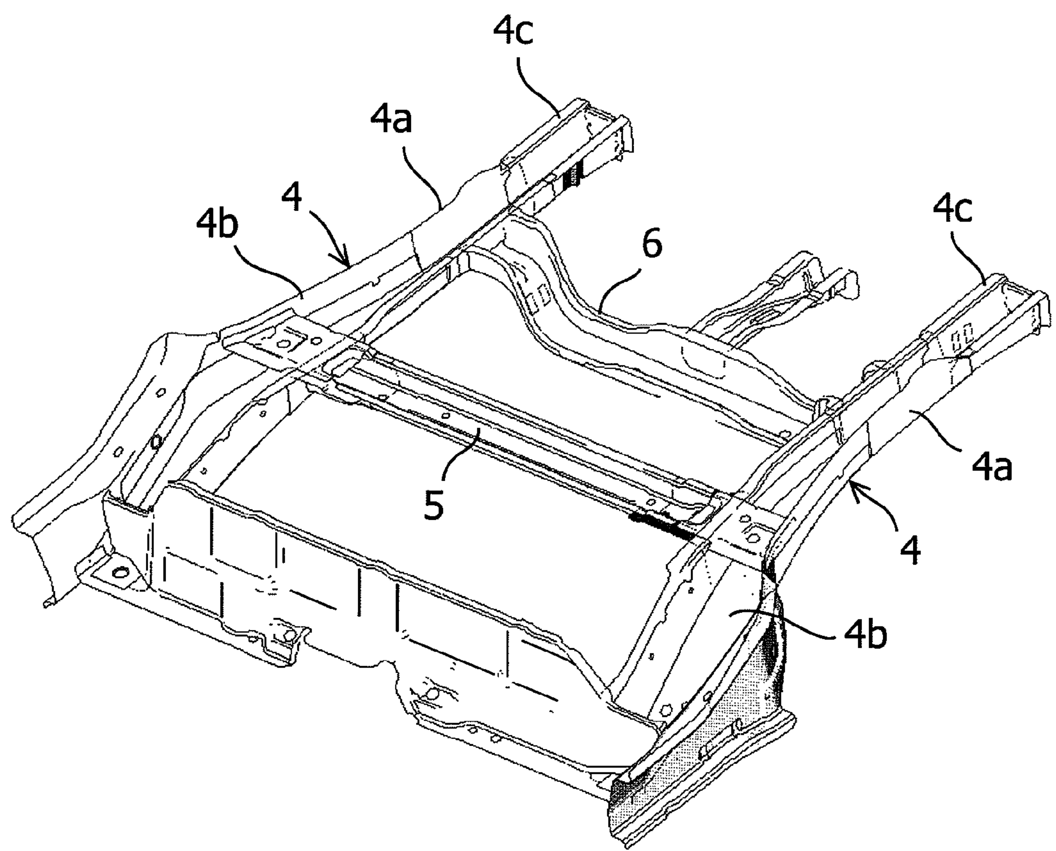
FIG. 4 is a perspective view showing a framework of the lower structure according to the embodiment of the present invention.

Hereinbelow, the structure of a vehicle body rear portion 1 of a vehicle according to an embodiment of the present invention will be described with reference to FIGS. 1 to 6.

A description is given of a main structure of the vehicle body rear portion 1 with reference to FIGS. 1 to 4. The vehicle body rear portion 1 located on the vehicle rear side is provided with a rear floor panel 2. The rear floor panel 2 spreads in a horizontal direction to form a floor of a cabin. A spare tire housing 3 for accommodating a spare tire (not shown) is formed on the rear floor panel 2 in such a manner as to be recessed downward. Rear side members 4 extending in a front and rear direction of the vehicle are respectively provided on right and left ends of the rear floor panel 2, in a width direction of the vehicle. Cross sections of the rear side members 4 in the width direction of the vehicle are substantially shaped like a hat which has an opening in its upper part. The paired rear side members 4 are welded to the right and left ends of the rear floor panel 2, respectively. The rear side members 4 are connected to each other by a rear cross member 5 which extends in the width direction of the vehicle in front of the spare tire housing 3. The rear side members 4 are also connected to each other by a spare tire cross member 6 which is attached to the rear floor panel 2 including the spare tire housing 3 and which extends in the width direction of the vehicle. The spare tire cross member 6 is arranged in such a manner as to extend through a center 3*a* of the spare tire housing 3 including an attachment bracket (not shown). The attachment bracket is provided for attaching the center of the spare tire to be accommodated in the spare tire housing 3.

A back panel 7 spreading in a vertical direction and the width direction of the vehicle is attached to rear ends of the rear side members 4 and a rear end of the rear floor panel 2. A bumper member 8 is attached to a rear surface of the back panel 7 on the vehicle rear side, and is arranged for the rear side members 4.

The rear side members 4 are described in detail. Each of the rear side members 4 includes: a front part 4*b* located on the front side of a joint part 4*a* joining with the spare tire cross member 6; and a rear part 4*c* located on the rear side of the joint part 4*a*. The front part 4*b* is formed on the front end side thereof in such a manner as to be gradually inclined upward toward the back of the vehicle. On the other hand, the front part 4*b* is formed on the rear end side thereof, in such a manner as to extend horizontally in the front and rear direction of the vehicle. The rear part 4*c* of the rear side member 4 is formed in such a manner as to extend horizontally in the front and rear direction of the vehicle.

Figure 5:
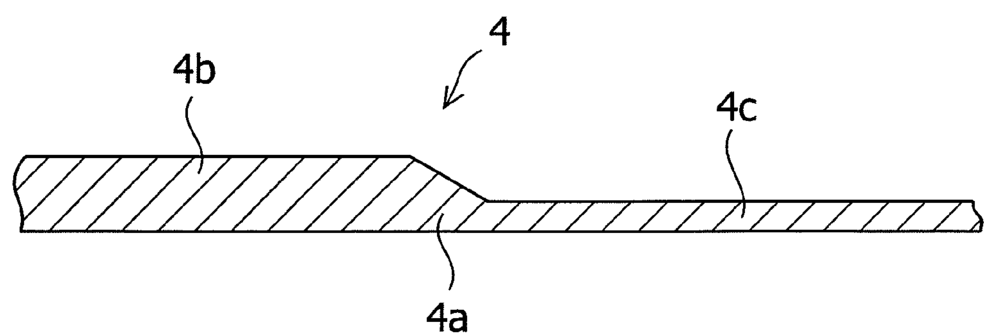
FIG. 5 is a cross-sectional view of the vehicle body rear portion taken along the line A-A in FIG. 3.

As shown in FIG. 5, the plate thickness of the rear part 4*c* of the rear side member 4 is formed to be smaller than the plate thickness of the front part 4*b* thereof. Inner surfaces of the front part 4*b* and the rear part 4*c* are arranged to form the same plane. The front part 4*b* and the rear part 4*c* as described above are connected together by tailored blank welding, and thereby the joint part 4*a* is formed to gradually become thinner from the front part 4*b* toward the rear part 4*c*. Accordingly, the rear part 4*c* has a lower rigidity than the front part 4*b* does.

Referring back to FIGS. 1 to 4, a bead 4*d* extending in the width direction of the vehicle is formed on a lower surface of each of the rear side members 4 at the joint part 4*a* thereof joining with the spare tire cross member 6. Although not particularly shown, the bead 4*d* is formed on the lower surface of the rear side member 4 in such a manner as to be recessed upward. For this reason, when a load is applied to the vehicle body rear portion 1 from behind the vehicle, a chevron folding is induced which has a protruding shape with the joint part 4*a* located on the upper side.

A description is given of effects of the vehicle body rear portion 1 in the embodiment of the present invention which receives a load applied from behind the vehicle.

Figure 6:
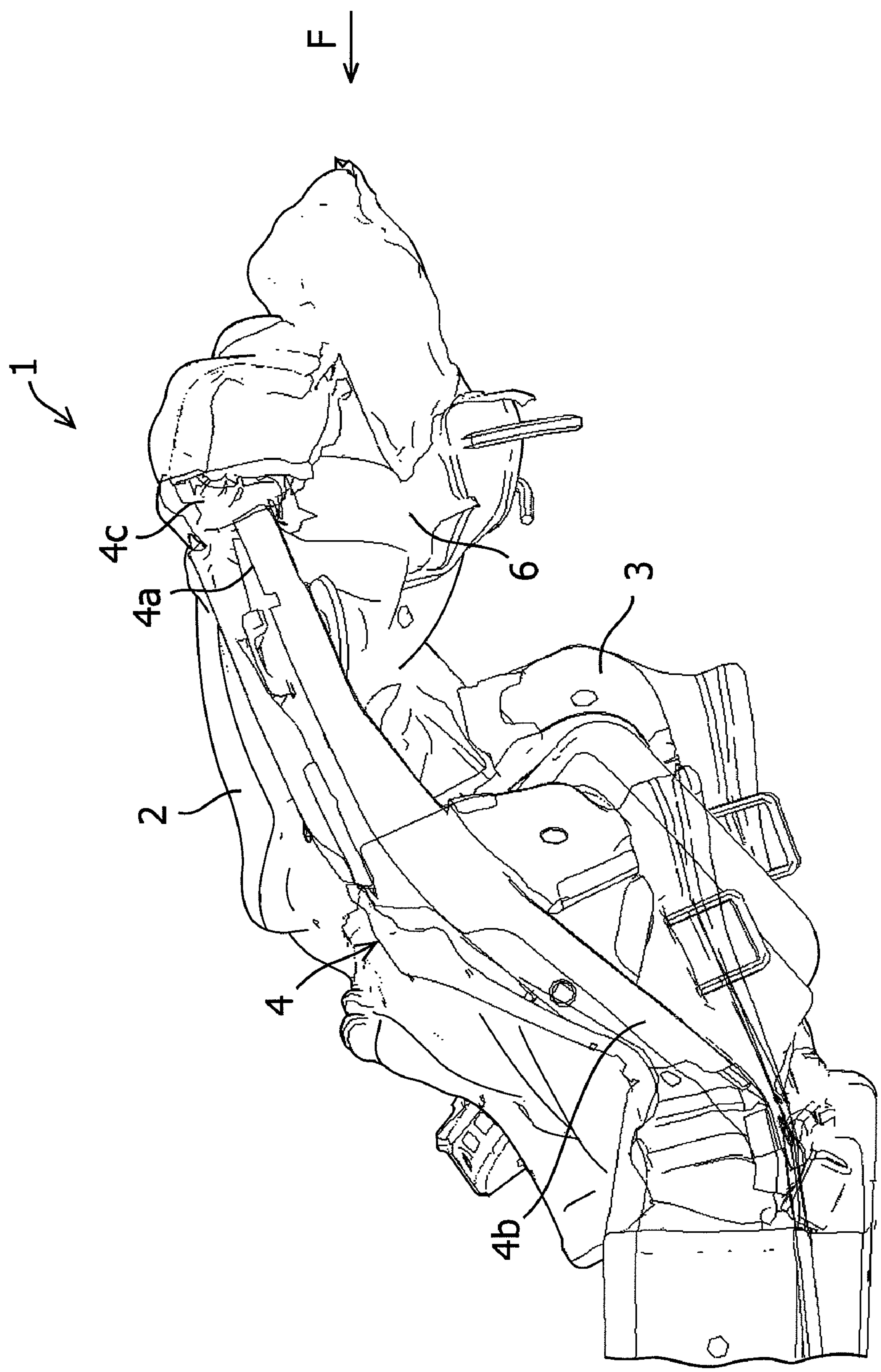
FIG. 6 is a side view showing a state after a load is applied to the lower structure according to the embodiment of the present invention from the back of the vehicle to the front.

When a load F (refer to FIGS. 1 and 6) is applied to the bumper member 8 from behind the vehicle, the load F is transmitted to the rear ends of the rear floor panel 2 and the rear side members 4 through the back panel 7. As shown in FIG. 6, due to such a load, each of the rear parts 4*c* of the rear side members 4 which has the lower rigidity, is deformed in the front and rear direction of the vehicle, and further each of the front parts 4*b* thereof which has the higher rigidity is deformed in such a manner that the rear-end portion of the front part 4*b* is lifted upward. Therefore, a chevron folding is formed on each of the rear side members 4. At this time, a chevron folding of the rear floor panel 2 is also formed according to the deformation of the rear side members 4.

According to the embodiment of the present invention as described above, the rigidity of the vehicle body is higher in the front part 4*b* of each of the rear side members 4 on the front side of the spare tire cross member 6, and is lower in the rear part 4*c* thereof on the rear side of the spare tire cross member 6. Therefore, when the load F is applied to the vehicle body rear portion 1 from behind the vehicle, the chevron foldings of the rear side members 4 can be formed reliably. The chevron folding has a shape in which the joint part 4*a* joining with the spare tire cross member 6 protrudes upward. In the same manner, the chevron folding on the rear floor panel 2 can also be formed reliably. Therefore, the rear part 4*c* having the lower rigidity is deformed in the front and rear direction of the vehicle, and thereby the load F is absorbed. This reduces the degree of upward protruding of the chevron foldings of the rear side members 4 and the rear floor panel 2. Thereby, components arranged below the rear floor panel 2 can still be spaced away from each other. Therefore, it is possible to efficiently absorb the load F to be applied thereto from behind the vehicle while preventing the components from coming close to each other and coming into contact with each other.

According to the embodiment of the present invention, each of the rear parts 4*c* of the rear side members 4 is formed to be thinner than the front part 4*b* thereof, and the front part 4*b* and the rear part 4*c* are connected together by the tailored blank welding. This reliably makes the rigidity of the rear part 4*c* lower than that of the front part 4*b*, thereby providing the aforementioned effects. Furthermore, this eliminates the need for adding reinforcing parts for enhancing the rigidity of the front part 4*b* and therefore eliminates the need for considering space for arranging the reinforcing parts. Accordingly, the layout of the components is not limited, and therefore the design flexibility is not reduced. In addition, there is no increase in vehicle weight by the weight of the reinforcing part. Accordingly, it is possible to more efficiently absorb the load applied from behind the vehicle while preventing the contact between the components arranged below the rear floor panel 2, reduction of the design flexibility, and increase of the vehicle weight.

According to the embodiment of the present invention, the bead 4*d* is formed on each of the joint parts 4*a* of the rear side members 4 which joins with the spare tire cross member 6. This can more reliably form the chevron foldings of the rear side members 4 with the joint parts 4*a* protruding upward. Similarly, the chevron folding of the rear floor panel 2 can be formed more reliably. Therefore, the aforementioned effects can be obtained more efficiently.

According to the embodiment of the present invention, the spare tire cross member 6 is arranged in such a manner as to extend through the center 3*a* of the spare tire housing 3. Therefore, the center 3*a* of the spare tire housing 3 formed on the rear floor panel 2 in such a manner as to be recessed downward corresponds to the protruding portions of the chevron foldings of the rear side members 4. This further reduces the upward protruding of the chevron foldings of the rear side members 4 and the rear floor panel 2. Accordingly, the aforementioned effects can be obtained more efficiently.

Heretofore, the embodiment of the present invention has been described. However, the present invention is not limited to the described embodiment. Various modifications and changes can be made based on the technical idea of the present invention.

For example, as a modification of this embodiment, the rear parts 4*c* of the rear side members 4 may extend in such a manner as to be inclined downward toward the back of the vehicle. This helps the moving of the rear parts 4*c* of the rear side members 4 to the lower side of the vehicle, and further reduces the upward protruding of the chevron foldings of the rear side members 4 and the rear floor panel 2. Therefore, it is possible to more efficiently absorb the load from behind the vehicle while preventing contact between the components arranged below the rear floor panel 2, reduction of the design flexibility, and increase of the vehicle weight.

What is claimed is:

1. A lower structure of a vehicle body rear portion, comprising:

a rear floor panel spreading in a horizontal direction in a rear portion of a vehicle;

a spare tire housing being formed on the rear floor panel in such a manner as to be recessed downward;

rear side members extending in a front and rear direction of the vehicle on respective right and left ends of the rear floor panel in a width direction of the vehicle, and being made of a plate material;

a rear cross member being arranged in front of the spare tire housing, and connecting the paired right and left rear side members; and a spare tire cross member being attached to the spare tire housing, and connecting the paired right and left rear side members;

wherein a rear part of each of the rear side members is formed to have a rigidity lower than a rigidity of a front part thereof, the rear part extends on the vehicle rear side from a joint part joining with the spare tire cross member, and the front part extends on the vehicle front side from the joint part which joins with the spare tire cross member;

wherein the rear part of each of the rear side members is formed to have a plate thickness smaller than a plate thickness of the front part of each of the rear side members, and the front part and the rear part of each of the rear side members are connected together by tailored blank welding;

wherein a bead is formed in a concave shape which is concaved upwardly on a lower surface of the joint part of each of the rear side members with the spare tire cross member, so as to induce folding deformations of the rear side members when a load is applied to the vehicle body from behind the vehicle, and the bead extends in the vehicle width direction; and wherein the bead is arranged so as to correspond to a section of the joint part in which the front part and the rear part of each of the rear side members are connected together by tailored blank welding.

2. A lower structure of a vehicle body rear portion, according to claim 1, wherein a lower surface of the rear part of each of the rear side members extends in such a manner as to be inclined downward toward the back of the vehicle.

3. A lower structure of a vehicle body rear portion, according to claim 1, wherein the spare tire cross member is arranged in such a manner as to extend through a center of the spare tire housing.

* * * * *